US012643609B2

(12) United States Patent
Yamada et al.

(10) Patent No.: US 12,643,609 B2
(45) Date of Patent: Jun. 2, 2026

(54) VEHICLE SIDE STRUCTURE

(71) Applicant: Honda Motor Co., Ltd., Tokyo (JP)

(72) Inventors: Hitomi Yamada, Saitama (JP); Atsushi Hasegawa, Saitama (JP); Ryotaro Takeuchi, Saitama (JP); Yasuhisa Egawa, Tokyo (JP); Yoshihiro Fujimura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 18/407,341

(22) Filed: Jan. 8, 2024

(65) Prior Publication Data

US 2024/0300582 A1 Sep. 12, 2024

(30) Foreign Application Priority Data

Mar. 7, 2023 (CN) .......................... 202310208083.2

(51) Int. Cl.
| | |
|---|---|
| *B62D 21/15* | (2006.01) |
| *B62D 25/02* | (2006.01) |
| *B62D 25/04* | (2006.01) |
| *B62D 25/20* | (2006.01) |

(52) U.S. Cl.
CPC ......... *B62D 21/157* (2013.01); *B62D 25/025* (2013.01); *B62D 25/04* (2013.01); *B62D 25/2036* (2013.01)

(58) Field of Classification Search
CPC .... B62D 21/157; B62D 25/025; B62D 25/04; B62D 25/2036; B62D 25/02; B60R 19/42; B60J 5/0425; B60J 5/0429
USPC ....................................... 296/193.06, 193.05
See application file for complete search history.

(56) References Cited

U.S. PATENT DOCUMENTS

| | | | | |
|---|---|---|---|---|
| 8,491,047 | B1 * | 7/2013 | Moll ...................... | B62D 25/04 296/193.06 |
| 9,308,941 | B2 * | 4/2016 | Kanaguchi ............. | B62D 25/04 |
| 2014/0339855 | A1 * | 11/2014 | Torii ...................... | B62D 25/04 296/193.06 |
| 2022/0315118 | A1 * | 10/2022 | Hasegawa ............ | B62D 21/157 |

(Continued)

FOREIGN PATENT DOCUMENTS

| | | | |
|---|---|---|---|
| JP | 2006321491 | A * | 11/2006 |
| JP | 2009262615 | | 11/2009 |
| JP | 6248959 | | 12/2017 |

OTHER PUBLICATIONS

English translation of JP2006321491A; https://translationportal.epo.org; Jan. 13, 2026 (Year: 2026).*

*Primary Examiner* — Roger L Pang
(74) *Attorney, Agent, or Firm* — JCIPRNET

(57) ABSTRACT

A vehicle side structure includes: a side sill, disposed on two sides of a floor panel in a vehicle width direction, and extending along a vehicle front-rear direction; a pillar, extending upward from the side sill in a vehicle up-down direction, and including a pillar outer member disposed on an outer side in the vehicle width direction; an inner component, joined to an upper surface of the side sill and a vehicle inner side surface of the pillar outer member; and a bracket, disposed on an upper portion of a vehicle inner side surface of the side sill, and connected to the inner component. A lower portion of the pillar outer member is formed with a fragile portion, and an upper end of the inner component is connected below an upper end of the fragile portion.

13 Claims, 5 Drawing Sheets

(56) References Cited

U.S. PATENT DOCUMENTS

2023/0202582 A1* 6/2023 Inagaki ................. B62D 25/04
                                            296/193.07
2023/0312003 A1* 10/2023 Hasegawa ............ B62D 25/025
                                            296/193.05

* cited by examiner

100

122(120)  132(130)

122a

128

W1

130a  126b

126a

126

134(130)

128

110a

112(110)  110b

140

VEHICLE SIDE STRUCTURE

CROSS-REFERENCE TO RELATED APPLICATION

This application claims the priority benefit of China application serial no. 202310208083.2, filed on Mar. 7, 2023. The entirety of the above-mentioned patent application is hereby incorporated by reference herein and made a part of this specification.

BACKGROUND

Technical Field

The disclosure relates to a vehicle structure, in particular to a vehicle side structure.

Description of Related Art

In recent years, efforts to provide access to sustainable transportation systems that also take into consideration those in disadvantaged positions among transportation participants, such as the elderly, the disabled, children, and the like, have been active. In order to achieve the above-mentioned purpose, research and development are devoted to further improving the safety and convenience of traffic through development related to improving collision safety performance. However, in the development related to improving the collision safety performance, how to balance the structural rigidity of the vehicle side structure with the collision safety performance is an issue.

For example, in the prior art, in a vehicle side structure composed of a side sill, a pillar, and other structures, the lower portion of the pillar is joined to the upper side of the side sill. When a side collision occurs to a vehicle using the vehicle side structure, the lower portion of the pillar bends and deforms inward in a vehicle width direction, thereby preventing the pillar from falling inward in the vehicle width direction. However, if the lower portion of the pillar is disposed with a low rigidity structure in order to guide the lower portion of the pillar to absorb the collision load through bending deformation, it may cause the lower portion of the pillar to easily intrude toward the vehicle inner side. Accordingly, if a highly rigid structure is disposed at the lower portion of the pillar, the upper end portion of the pillar may bend and deform and intrude toward the vehicle inner side. Therefore, it is necessary to improve the structural setting of the vehicle side structure to take into account both structural rigidity and collision safety performance.

In order to solve the above-mentioned problems, the disclosure aims to more effectively absorb the collision load when a side collision occurs to the vehicle, thereby improving the rigidity of the vehicle body and suppressing the intrusion of the pillars toward the vehicle inner side, and in turn contributing to the development of a sustainable conveyor system.

SUMMARY

The disclosure provides a vehicle side structure that can more effectively absorb the collision load when a side collision occurs to a vehicle, thereby improving the rigidity of the vehicle body and suppressing the intrusion of pillars toward the vehicle inner side.

A vehicle side structure of the disclosure includes: a side sill, disposed on two sides of a floor panel in a vehicle width direction, and extending along a vehicle front-rear direction; a pillar, extending upward from the side sill in a vehicle up-down direction, and including a pillar outer member disposed on an outer side in the vehicle width direction; an inner component, joined to an upper surface of the side sill and a vehicle inner side surface of the pillar outer member; and a bracket, disposed on an upper portion of a vehicle inner side surface of the side sill, and connected to the inner component. A lower portion of the pillar outer member is formed with a fragile portion, and an upper end of the inner component is connected below an upper end of the fragile portion.

Based on the above, in the vehicle side structure of the disclosure, the inner component is joined to the upper surface of the side sill and the vehicle inner side surface of the pillar outer member, and the bracket is disposed on the upper portion of the vehicle inner side surface of the side sill and connects the inner component. The lower portion of the pillar outer member is formed with a fragile portion, and the upper end of the inner component is connected below the upper end of the fragile portion. In this way, when a side collision occurs to the vehicle using the vehicle side structure, since the inner component do not extend to the upper end of the fragile portion, the pillar can be bent using the upper end of the fragile portion as a starting point to absorb the collision load. That is, the inner component disposed to increase the rigidity of the vehicle body does not affect the effect of the fragile portion in absorbing the collision load through bending deformation. In addition, the inner component and the bracket can support the pillar outer member from the vehicle inner side, and can transmit the collision load in the vehicle up-down direction, so that the collision load can be borne by the highly rigid side sill, inner component, bracket, etc, and converted into bending deformation in the vehicle up-down direction, thereby suppressing the deformation of the pillar toward the vehicle inner side. Accordingly, the vehicle side structure of the disclosure can more effectively absorb the collision load when a side collision occurs to the vehicle, thereby improving the rigidity of the vehicle body and suppressing the intrusion of the pillars toward the vehicle inner side.

In order to make the above-mentioned features and advantages of the disclosure clearer and easier to understand, the following embodiments are given and described in details with accompanying drawings as follows.

DESCRIPTION OF THE EMBODIMENTS

Figure 1:
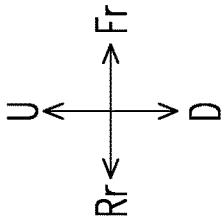
FIG. 1 is a schematic partial structural view of a vehicle inner side of a vehicle side structure according to an embodiment of the disclosure.

In an embodiment of the disclosure, the pillar outer member has a panel thickness changing portion whose panel thickness becomes thinner toward the fragile portion, and the fragile portion is formed on the lower portion of the pillar outer member through the panel thickness changing portion.

In an embodiment of the disclosure, the upper end of the fragile portion is formed further up than the inner component and has a gap that does not contact the inner component, and a width of the gap in the vehicle up-down direction is shorter than a width of the panel thickness changing portion in the vehicle up-down direction.

In an embodiment of the disclosure, the inner component has opposite surfaces opposite to the pillar outer member and side surfaces extending from the opposite surface toward the pillar outer member, and a closed cross-section is formed on an inner side of the pillar outer member in the vehicle width direction.

In an embodiment of the disclosure, the bracket has a front side wall and a rear side wall connected to the inner component, and an inner side wall connected to the front side wall and the rear side wall, and has a cover-like cross-section.

In an embodiment of the disclosure, the inner component has a first inner component disposed on a vehicle front side and a second inner component disposed on the vehicle rear side. The front side wall is connected to the first inner component, and the rear side wall is connected to the second inner component.

In an embodiment of the disclosure, the front side wall and the rear side wall of the bracket are formed with a first protruding rib extending in the vehicle width direction, and a section area of the first protruding rib becomes smaller toward the inner side in the vehicle width direction.

In an embodiment of the disclosure, a side surface of the inner component is formed with a second protruding rib extending in the vehicle width direction, and the first protruding rib on the rear side wall of the bracket overlaps the second protruding rib on the side surface of the inner component in the vehicle width direction.

In an embodiment of the disclosure, the vehicle side structure further includes: a door beam, disposed around the side sill and the pillar, and having a closed cross-section protruding toward the outer side in the vehicle width direction, and an end portion of the door beam overlaps the fragile portion in the vehicle front-rear direction.

In an embodiment of the disclosure, the vehicle side structure further includes: a patch, disposed on an outer side of the door beam in the vehicle width direction, having an outer side surface, and an upper side surface and a lower side surface extending from the outer side surface toward the inner side in the vehicle width direction. The patch is joined to the door beam through the upper side surface and the lower side surface, and a closed cross-section is formed on the outer side of the door beam in the vehicle width direction. The closed cross-section formed by the patch extends from the door beam to an outer side of the pillar, and overlaps the pillar when viewed from the side.

In an embodiment of the disclosure, an end portion of the patch is disposed at a position further down than the upper end of the fragile portion.

Figure 2:
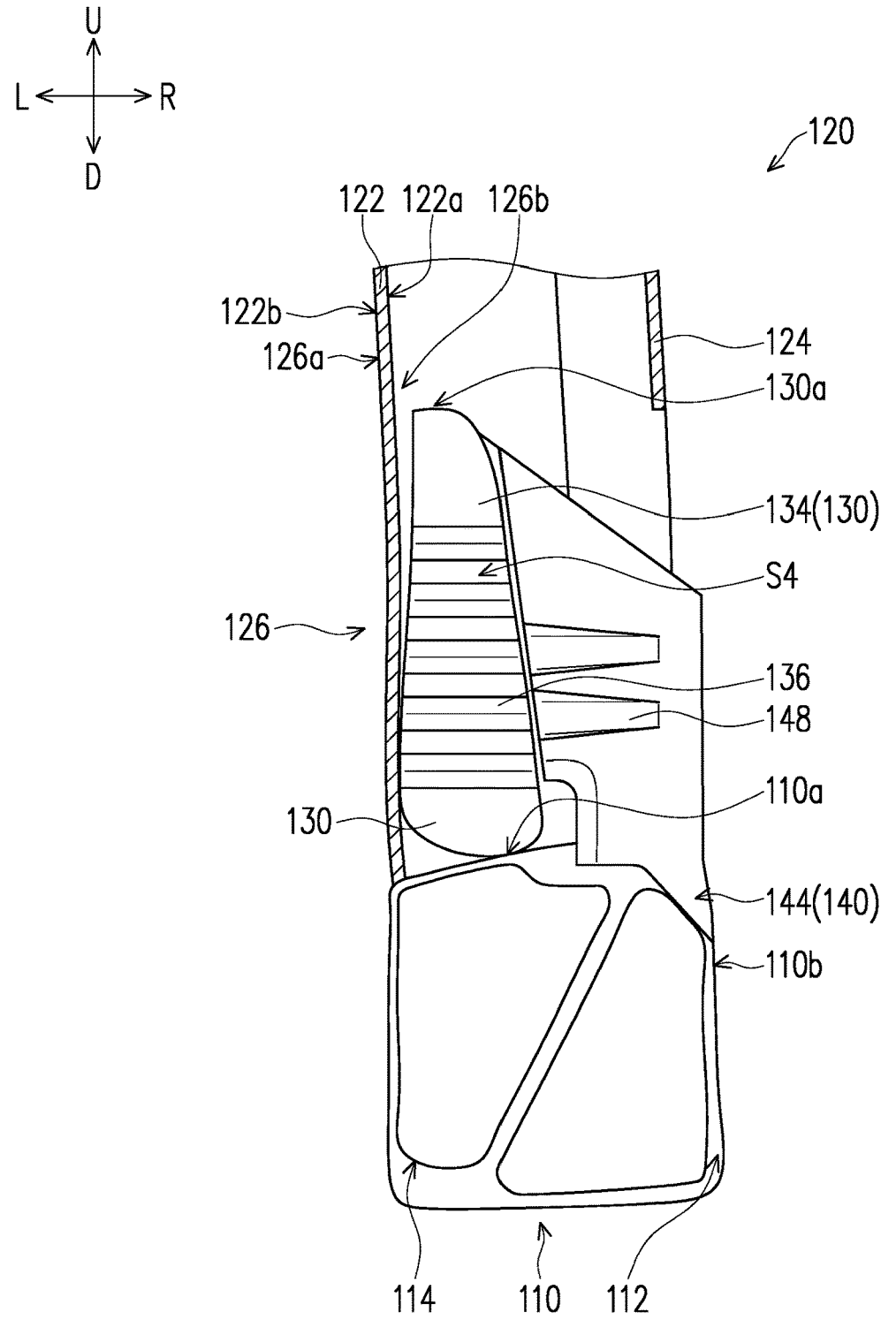
FIG. 2 is a schematic cross-sectional view of the vehicle side structure shown in FIG. 1 in a vehicle width direction.
Figure 3:
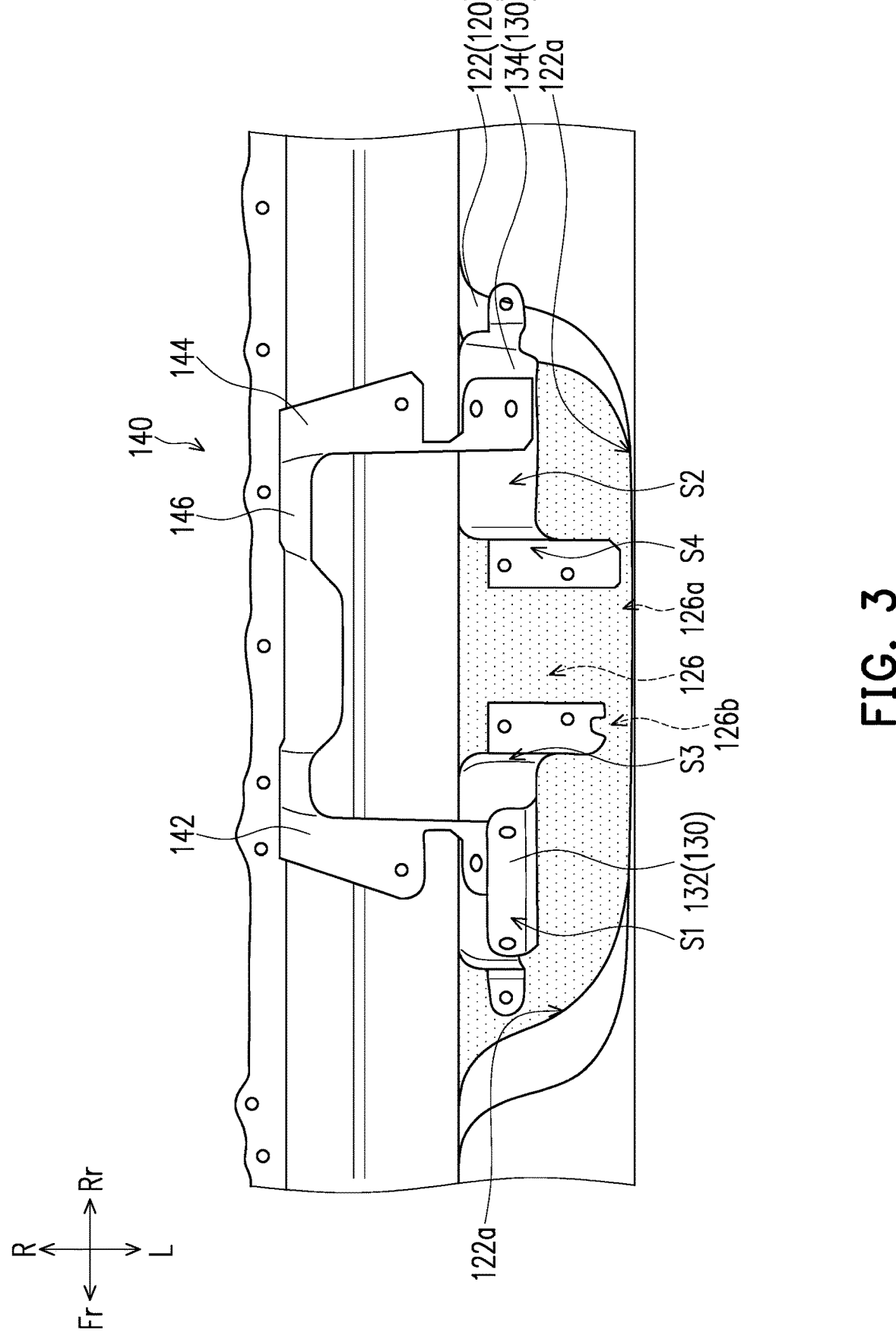
FIG. 3 is a schematic cross-sectional view of the vehicle side structure shown in FIG. 1 in a vehicle front-rear direction.
Figure 4:
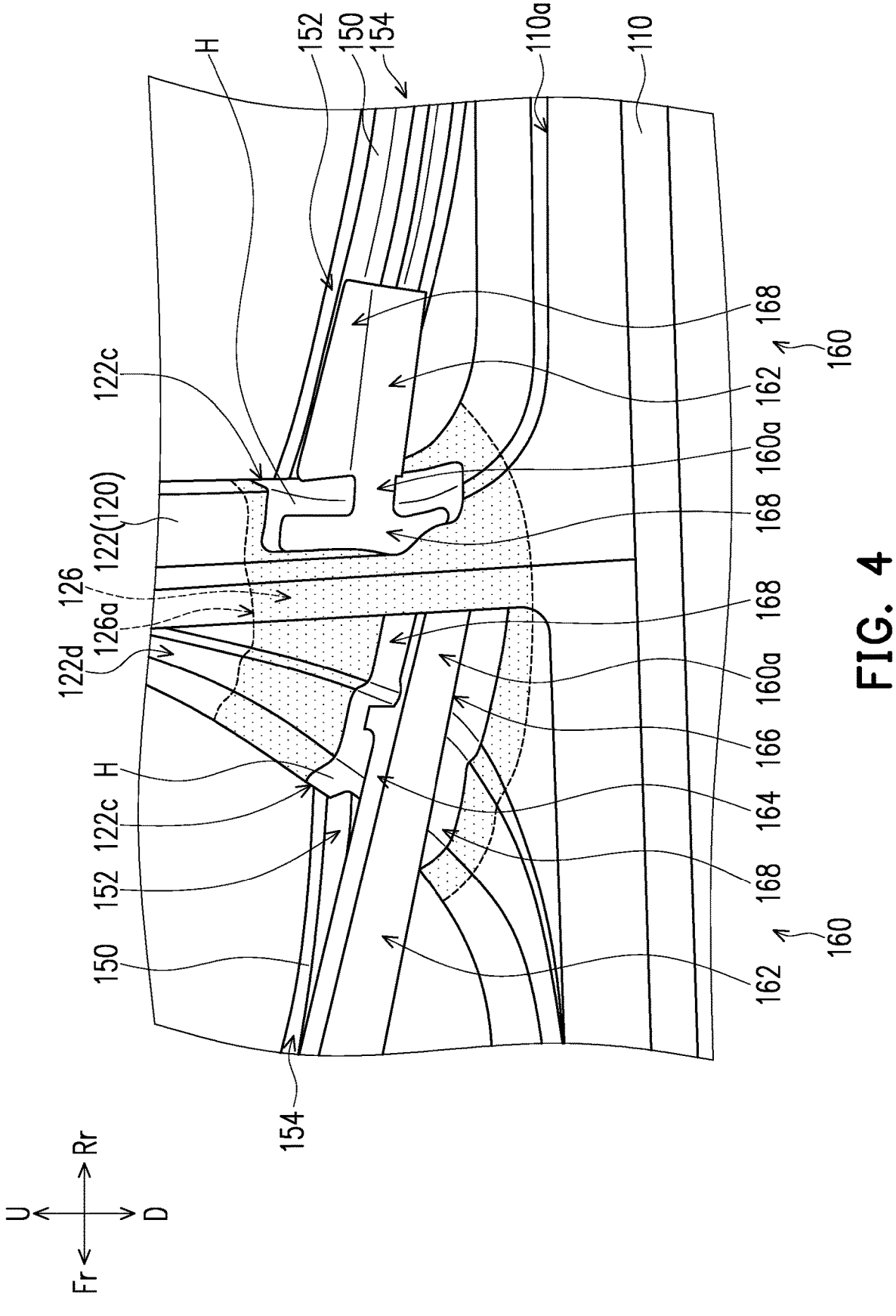
FIG. 4 is a schematic partial structural view of a vehicle outer side of the vehicle side structure shown in FIG. 1.
Figure 5:
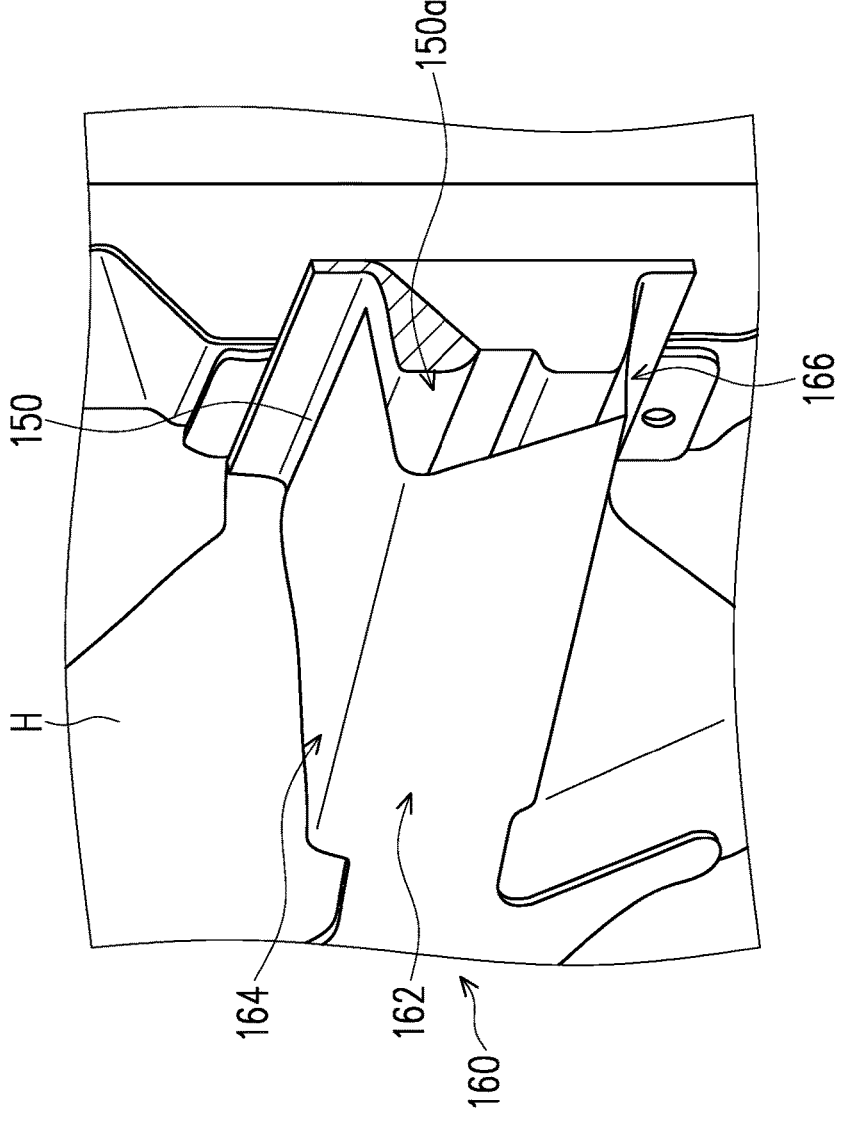
FIG. 5 is a schematic cross-sectional view of the vehicle side structure shown in FIG. 4 in a vehicle width direction.

Reference will now be made in detail to the present preferred embodiments of the disclosure, examples of which are illustrated in the accompanying drawings. FIG. 1 is a schematic partial structural view of a vehicle inner side of a vehicle side structure according to an embodiment of the disclosure. FIG. 2 is a schematic cross-sectional view of the vehicle side structure shown in FIG. 1 in a vehicle width direction. FIG. 3 is a schematic cross-sectional view of the vehicle side structure shown in FIG. 1 in a vehicle front-rear direction. FIG. 4 is a schematic partial structural view of a vehicle outer side of the vehicle side structure shown in FIG. 1. FIG. 5 is a schematic cross-sectional view of the vehicle side structure shown in FIG. 4 in a vehicle width direction. The specific composition of a vehicle side structure 100 of the embodiment will be described below with reference to FIG. 1 to FIG. 5. A vehicle front-rear direction is, for example, a vehicle front direction Fr and a vehicle rear direction Rr in the drawings. A vehicle width direction is, for example, a vehicle left direction L and a vehicle right direction R in the drawings. A vehicle up-down direction is, for example, a vehicle up direction U and a vehicle down direction D in the drawings. However, this is only one example, and the disclosure is not limited thereto.

Please refer to FIG. 1 and FIG. 2. In the embodiment, the vehicle side structure 100 refers to the structure provided on the left and right sides of the vehicle (not shown) in the vehicle width direction (that is, the side corresponding to the vehicle left direction L or the vehicle right direction R). Therefore, the vehicle can be disposed with the vehicle side structure 100 as shown in FIG. 1 and FIG. 2 on each of the left and right sides. FIG. 1 and FIG. 2 take the vehicle side structure 100 disposed on the left side of the vehicle as an example, so the outer side in the vehicle width direction described later refers to the side corresponding to the vehicle left direction L, and the inner side in the vehicle width direction refers to, for example, the side corresponding to the vehicle right direction R, but the disclosure is not limited thereto. The vehicle side structure 100 includes a side sill 110, a pillar 120, an inner component 130, and a bracket 140. The side sill 110 is disposed on two sides of the floor panel (not shown) in the vehicle width direction and extend along the vehicle front-rear directions (i.e., the vehicle front direction Fr and the vehicle rear direction Rr). The pillar 120 extends upward from the side sill 110 in the vehicle up-down direction (i.e., the vehicle upper direction U and the vehicle lower direction D), and includes a pillar outer member 122 disposed on the outer side in the vehicle width direction. The inner component 130 is joined to an upper surface 110a of the side sill 110 and a vehicle inner side surface 122a of the pillar outer member 122. The bracket 140 is disposed on the upper portion of a vehicle inner side surface 110b of the side sill 110 and connects the inner component 130. However, the disclosure does not limit the specific location of the vehicle side structure 100 (that is, does not limit the application of the vehicle side structure 100 in the vehicle), and does not limit the specific structure of the vehicle to which the vehicle side structure 100 is applied, which can be adjusted according to requirements.

Specifically, in the embodiment, the floor panel (not shown) is, for example, a panel having a concave and convex structure to form the bottom of the vehicle on the lower side of the vehicle. The side sill 110 is a frame structure extending in the vehicle front-rear direction, and is, for example, a hollow frame composed of a side sill inner member 112 and a side sill reinforcement member 114 disposed on the outer side of the side sill inner member 112 in the vehicle width direction and having a closed cross-section (as shown in FIG. 2), resulting in higher rigidity. Similarly, the pillar 120 is a frame structure extending in the vehicle up-down direction, and is, for example, a hollow frame composed of a pillar outer member 122 and a pillar inner member 124 disposed on the inner side of the pillar outer member 122 in the vehicle width direction and having a closed cross-section (as shown in FIG. 2), resulting in higher rigidity. In this way, the side sill 110 and the pillar 120 constitute the basic structure of the vehicle side structure 100 in the vehicle front-rear direction and the vehicle up-down direction, so that panels such as doors (not shown) can be installed on the inner and outer sides of the side sill 110 and the pillar 120 in the vehicle width direction to form the vehicle side structure 100. However, the disclosure does not limit the specific structures of the side sill 110 and the pillar 120, which can be adjusted according to requirements.

Furthermore, in the embodiment, as shown in FIG. 1 to FIG. 3, the inner component 130 is, for example, a cover structure composed of a panel, and is disposed on the upper surface 110a of the side sill 110 and the vehicle inner side surface 122a of the pillar outer member 122. Similarly, the bracket 140 is, for example, a cover structure composed of a panel, and is disposed on the upper portion of the vehicle inner side surface 110b of the side sill 110 and connected to the inner component 130. The inner component 130 disposed on the vehicle inner side surface 122a of the pillar outer member 122 and the bracket 140 connecting the inner component 130 are disposed on the inner side of the pillar outer member 122 in the vehicle width direction as a reinforcement structure, that is, the inner component 130 and the bracket 140 is located between the pillar outer member 122 and the pillar inner member 124 (shown in FIG. 2). In this way, the pillar outer member 122 of the pillar 120 is supported by the inner component 130 and the bracket 140 on the inner side in the vehicle width direction, thereby improving the structural rigidity of the vehicle side structure 100. However, the disclosure does not limit the specific structures of the inner component 130 and the bracket 140, which can be adjusted according to requirements.

Furthermore, in the embodiment, a lower portion 122b of the pillar outer member 122 is formed with a fragile portion 126, and an upper end 130a of the inner component 130 is connected below an upper end 126a of the fragile portion 126. The fragile portion 126 is a low-rigidity portion formed on the lower portion 122b of the pillar outer member 122 and can easily absorb a collision load through bending deformation. Accordingly, the upper end 130a of the inner component 130 is connected to a position further down than the upper end 126a of the fragile portion 126. That is, the upper end 130a of the inner component 130 and the upper end 126a of the fragile portion 126 are misaligned in the vehicle up-down direction such that the upper end 126a of the fragile portion 126 extends to a higher position than the upper end 130a of the inner component 130. In this way, when a side collision occurs to the vehicle using the vehicle side structure 100, since the inner component 130 does not extend to the upper end 126a of the fragile portion 126, the pillar 120 can be bent using the upper end 126a of the fragile portion 126 as a starting point to absorb the collision load. That is, the inner component 130 disposed to increase the rigidity of the vehicle body does not affect the effect of the fragile portion 126 in absorbing the collision load through bending deformation. In addition, the inner component 130 and the bracket 140 can support the pillar outer member 122 from the vehicle inner side and can transmit the collision load in the vehicle up-down direction. Therefore, the collision load can be borne by the highly rigid side sill 110, inner component 130, bracket 140 and the like, and converted into a bending deformation in the vehicle up-down direction, thereby suppressing the deformation of the pillar 120 toward the vehicle inner side. Accordingly, the vehicle side structure 100 can more effectively absorb the collision load when a side collision occurs to the vehicle, thereby improving the rigidity of the vehicle body and suppressing the intrusion of the pillar 120 toward the vehicle inner side.

Furthermore, in the embodiment, as shown in FIG. 1, the pillar outer member 122 has a panel thickness changing portion 128 whose panel thickness becomes thinner toward the fragile portion 126, and the fragile portion 126 is formed in the lower portion 122b of the pillar outer member 122 through the panel thickness changing portion 128. That is to say, the panel thickness of the pillar outer member 122 becomes thinner toward the fragile portion 126 through the thickness changing portion 128 such that the fragile portion 126 with a thinner panel thickness and a low rigidity is formed on the lower portion 122b of the pillar outer member 122, and the panel thickness changing portion 128 corresponds to a transition region (for example, configured as an inclined surface) in which the panel thickness of the pillar outer member 122 changes. In this way, the provision of the panel thickness changing portion 128 can prevent the fragile portion 126 from suddenly bending during a side collision due to obvious rigidity differences around the fragile portion 126 (that is, the fragile portion 126 can be bent slowly through the guidance of the panel thickness changing portion 128). In addition, when the collision load is transmitted in the vehicle up-down direction, the fragile portion 126 with low rigidity can be first bent and deformed, and then converted to the bending deformation in the vehicle up-down direction through the guidance of the panel thickness changing portion 128, thereby suppressing the intrusion of the pillar 120 toward the vehicle inner side.

In addition, in the embodiment, as shown in FIG. 1, the upper end 126a of the fragile portion 126 is formed further up than the inner component 130 and has a gap 126b that does not contact the inner component 130, and a width w1 of the gap 126b in the vehicle up-down direction is shorter than a width w2 of the panel thickness changing portion 128 in the vehicle up-down direction. That is, the upper end 126a of the fragile portion 126 and the upper end 130a of the inner component 130 are misaligned in the vehicle up-down direction to form the gap 126b. The gap 126b of the fragile portion 126 does not contact the inner component 130 and is not supported by the inner component 130. In this way, the portion of the upper end 126a of the fragile portion 126 corresponding to the gap 126b has the lowest rigidity and can be used as a starting point for bending during a side collision. In addition, the width w2 of the panel thickness changing portion 128 is larger than the width w1 of the gap 126b, so that the panel thickness changing portion 128 can effectively guide the collision load toward the gap 126b where the fragile portion 126 is used as a starting point for bending, and the gap 126b of the fragile portion 126 can more reliably absorb the collision load through bending deformation. However, the disclosure does not limit whether the panel thickness changing portion 128 and the gap 126b are disposed, which can be adjusted according to needs.

In addition, in the embodiment, as shown in FIG. 3, the inner component 130 has opposite surfaces S1 and S2 opposite to the pillar outer member 122 and side surfaces S3 and S4 extending from the opposite surfaces S1 and S2 toward the pillar outer member 122, and a closed cross-section is formed on the inner side of the pillar outer member 122 in the vehicle width direction. The inner component 130 has a first inner component 132 disposed on the vehicle front side (i.e., the side corresponding to the vehicle front direction Fr), and a second inner component 134 disposed on the vehicle rear side (i.e., the side corresponding to the vehicle rear direction Rr). The first inner component 132 has the opposite surface S1 opposite to the pillar outer member 122 and the side surface S3 (corresponding to the rear side surface) extending from the opposite surface S1 toward the pillar outer member 122, and is configured as a cover-like structure with an L-shaped cross-section. Similarly, the second inner component 134 has the opposite surface S2 opposite to the pillar outer member 122 and the side surface S4 (corresponding to the front side surface) extending from the opposite surface S2 toward the pillar outer member 122, and is configured as a cover-like structure with an L-shaped cross-section. The first inner component 132 and the second inner component 134 are each joined to the vehicle inner side surface 122*a* of the pillar outer member 122 and are separated from each other (i.e., the side surfaces S3 and S4 are separated by a distance).

Furthermore, as shown in FIG. 3, in the embodiment, the front end side of the opposite surface S1 and the outer end portion of the side surface S3 (corresponding to the rear side surface) of the first inner component 132 are joined to the vehicle inner side surface 122*a* of the pillar outer member 122 (configured as a concave shape) to form a closed cross-section on the vehicle inner side surface 122*a* of the pillar outer member 122. Similarly, the rear end side of the opposite surface S2 and the outer end portion of the side surface S4 (corresponding to the front side surface) of the second inner component 134 are joined to the vehicle inner side surface 122*a* of the pillar outer member 122 (configured as a concave shape) to form a closed cross-section on the vehicle inner side surface 122*a* of the pillar outer member 122. In this way, the inner component 130 (including the first inner component 132 and the second inner component 134) configured as a closed cross-section can improve structural rigidity. In addition, dividing the inner component 130 into two parts can more effectively transmit the collision load to the bracket 140 disposed on the inner side in the vehicle width direction (as explained later). However, in other embodiments not shown, the inner component 130 may not be divided into two parts and a single panel may be used as the inner component 130. The disclosure does not limit the specific structure of the inner component 130, which can be adjusted according to requirements.

Furthermore, in the embodiment, as shown in FIG. 3, the bracket 140 has a front side wall 142 and a rear side wall 144 connected to the inner component 130 and an inner side wall 146 connecting the front side wall 142 and the rear side wall 144, and has a cover-like cross-section. Furthermore, the bracket 140 is configured such that the inner side wall 146 is disposed opposite to the vehicle inner side surface of the inner component 130 (corresponding to the aforementioned opposite surfaces S1 and S2), and the front side wall 142 and the rear side wall 144 each extend from the front end and the rear end of the inner side wall 146 toward the vehicle inner side surface (opposite surfaces S1 and S2) of the inner component 130 to have a cover-like cross-section, so as to cover the inner component 130 to form a closed cross-section after being connected to the inner component 130. Preferably, the front side wall 142 is connected to the first inner component 132 (e.g., joined on the opposite surface S1), and the rear side wall 144 is connected to the second inner component 134 (e.g., joined on the opposite surface S2). In this way, the collision load can be reliably transmitted from the first inner component 132 and the second inner component 134 through the front side wall 142 and the rear side wall 144 toward the inner side in the vehicle width direction to the bracket 140, so that the bracket 140 having a cover-like cross-section can be reliably deformed and used as a crushing component to absorb the collision load. However, in other embodiments not shown, the inner component 130 may not be divided into two parts and a single panel may be used as the inner component 130, and the collision load may be transmitted from the inner component 130 to the bracket 140 having a cover-like cross-section to absorb the collision load. The disclosure does not limit the specific structure of the inner component 130, which can be adjusted according to requirements.

In addition, in the embodiment, as shown in FIG. 2, the front side wall 142 and the rear side wall 144 of the bracket 140 are formed with first protruding ribs 148 extending in the vehicle width direction (FIG. 2 shows the first protruding ribs 148 formed on the rear side wall 144 as an example for illustration). The cross-section area of the first protruding rib 148 becomes smaller toward the inner side in the vehicle width direction. That is, the protruding size of the first protruding rib 148 becomes smaller from the side closer to the inner component 130 toward the vehicle inner side. The number of first protruding ribs 148 may be plural and disposed in parallel in the vehicle up-down direction. In this way, the first protruding rib 148 extending in the vehicle width direction can improve the structural rigidity of the bracket 140 to bear the collision load during a side collision. Furthermore, when the bracket 140 bears a collision load and undergoes bending deformation in the vehicle up-down direction, the first protruding rib 148 whose cross-section becomes smaller toward the vehicle inner side can ensure the absorption amount of the collision load, thereby suppressing the deformation of the pillar 120 toward the vehicle inner side. Correspondingly, the side surfaces S3 and S4 of the inner component 130, such as the side surface S4 of the second inner component 134, are formed with second protruding ribs 136 extending in the vehicle width direction. The number of second protruding ribs 136 may be plural and disposed in parallel in the vehicle up-down direction. In this way, the second protruding rib 136 extending in the vehicle width direction can improve the structural rigidity of the inner component 130 (the second inner component 134) to bear the collision load during a side collision, and can ensure the absorption amount of the collision load during bending deformation, thereby suppressing the deformation of the pillar 120 toward the vehicle inner side.

Furthermore, in the embodiment, as shown in FIG. 2, the first protruding rib 148 on the rear side wall 144 of the bracket 140 and the second protruding rib 136 on the side surface S4 of the second inner component 134 are overlapped in the vehicle width direction. That is to say, the side surface S4 of the second inner component 134 is disposed adjacent to the rear side wall 144 of the bracket 140, and the second protruding rib 136 and the first protruding rib 148 extend substantially continuously from the vehicle inner side surface 122*a* of the pillar outer member 122 toward the vehicle inner side in the vehicle width direction. In this way, the inner component 130 (e.g., the second inner component 134) and the bracket 140 that are joined to each other can be configured as a structure with higher rigidity. Moreover, when a side collision occurs to the vehicle, the collision load can be more effectively transmitted through the second protruding rib 136 and the first protruding rib 148 that are overlapped in the vehicle width direction and extend substantially continuously, so that more collision load can be absorbed, thereby suppressing the deformation of the pillar 120 toward the vehicle inner side. However, although the above description takes the example of disposing the second protruding rib 136 on the side surface S4 of the second inner component 134 instead of disposing the second protruding rib 136 on the side surface S3 of the first inner component 132, in other embodiments not shown, for example, the second protruding rib 136 may also be disposed on the side surface S3 of the first inner component 132, and the second protruding rib 136 disposed on the side surface S3 of the first inner component 132 may also be overlapped with the first protruding rib 148 on the front side wall 142 of the bracket 140 in the vehicle width direction. The disclosure does not limit the disposition position and the disposition of the second protruding rib 136 of the inner component 130 and the first protruding rib 148 of the bracket 140, which can be adjusted according to requirements.

Furthermore, in the embodiment, as shown in FIG. 4 and FIG. 5, the vehicle side structure 100 further includes a door beam 150. The door beam 150 is disposed around the side sill 110 and the pillar 120 and has a closed cross-section protruding toward the outer side in the vehicle width direction. That is, the door beam 150 is configured as a hollow frame structure that extends obliquely in the vehicle front-rear direction, and is, for example, connected to a side edge 122*c* of the pillar outer member 122 in the vehicle front-rear direction (as shown in FIG. 4), and fixed by an additional bracket H (not limited thereto) such that the closed cross-section thereof protrudes toward the outer side in the vehicle width direction (as shown in FIG. 5). The door beam 150 can be disposed with a pair of front and rear door beams. One end portion 152 is disposed at the side edge 122*c* of the pillar outer member 122, and another end portion 154 extends obliquely in a direction away from the pillar outer member 122 along the vehicle front-rear direction. In addition, panels such as vehicle doors (not shown) may be disposed on the door beam 150. Preferably, the end portion 152 of the door beam 150 is overlapped with the fragile portion 126 in the vehicle front-rear direction (as shown in FIG. 4), for example, being joined to the portion corresponding to the fragile portion 126 on the side edge 122*c* of the pillar outer member 122 or further extending into the fragile portion 126. In this way, when a side collision occurs to the vehicle, the collision load generated by the offset collision with the pillar 120 can be transmitted from the door beam 150 to the fragile portion 126 formed on the pillar outer member 122, so that the pillar 120 can be reliably bent using the upper end 126*a* of the fragile portion 126 as a starting point to absorb the collision load. However, the disclosure does not limit the number, specific structure, and disposition of the door beam 150, which can be adjusted according to requirements.

In addition, in the embodiment, as shown in FIG. 4 and FIG. 5, the vehicle side structure 100 further includes a patch 160. The patch 160 is disposed on the outer side of the door beam 150 in the vehicle width direction, and has an outer side surface 162, and an upper side surface 164 and a lower side surface 166 extending from the outer side surface 162 toward the inner side in the vehicle width direction. That is, the patch 160 is also configured to have a cover-like cross-section to have a high rigidity. The patch 160 may be disposed with a pair of front and rear patches corresponding to the number and position of the door beam 150. The patch 160 is joined to the door beam 150 through the upper side surface 164 and the lower side surface 166 to form a closed cross-section on the outer side of the door beam 150 in the vehicle width direction. That is, the patch 160 is joined to a vehicle outer side surface 150*a* of the door beam 150 with the open end between the upper side surface 164 and the lower side surface 166 facing the door beam 150, so that the patch 160 and the vehicle outer side surface 150*a* of the door beam 150 is configured as a closed cross-section. Preferably, the closed cross-section formed by the patch 160 extends from the door beam 150 toward the outer side of the pillar 120 (the pillar outer member 122), and is overlapped with the pillar 120 (the pillar outer member 122) when viewed from the side. That is, an end portion 160*a* of the patch 160 extends toward the outer side of the pillar 120 to cover at least a portion of a vehicle outer side surface 122*d* of the pillar outer member 122 (as shown in FIG. 4). In this way, when a side collision occurs to the vehicle and an offset collision offset from the pillar 120 occurs, the collision load borne and transmitted by the door beam 150 can be absorbed through the patch 160 joined to the door beam 150. Furthermore, the patch 160 whose closed cross-section extends from the door beam 150 to the outer side of the pillar 120 can transmit the collision load to a wider range.

In addition, in the embodiment, as shown in FIG. 4, the end portion 160*a* of the patch 160 is disposed at a position further down than the upper end 126*a* of the fragile portion 126. That is, similar to the aforementioned inner component 130, the end portion 160*a* of the patch 160 is located in the fragile portion 126 and overlapped with the fragile portion 126, and the end portion 160*a* of the patch 160 and the upper end 126*a* of the fragile portion 126 are misaligned in the vehicle up-down direction, so that the upper end 126*a* of the fragile portion 126 extends to a higher position than the end portion 160*a* of the patch 160, and the end portion 160*a* of the patch 160 and the upper end 130*a* of the inner component 130 correspond to each other on the vehicle outer side and the vehicle inner side surface of the pillar outer member 122. In this way, when a side collision occurs to the vehicle, since the end portion 160*a* of the patch 160 does not extend to the upper end 126*a* of the fragile portion 126, the pillar 120 can be bent using the upper end 126*a* of the fragile portion 126 as a starting point to absorb the collision load. That is, the patch 160 disposed to increase the rigidity of the vehicle body does not affect the effect of the fragile portion 126 in absorbing the collision load through bending deformation.

Furthermore, in the embodiment, as shown in FIG. 4, the end portion 160*a* of the patch 160 may also be disposed with a flange portion 168 extending in the vehicle up-down direction. For example, the flange portion 168 is disposed at the end portion 160*a* of the patch 160 and extends along the vehicle up-down direction from the side edges of the upper side surface 164 and the lower side surface 166, thereby joining the vehicle outer side surface 122*d* of the pillar outer member 122 and overlapping with the fragile portion 126 (such as the flange portion 168 disposed on the patch 160 on the left side in FIG. 4). Alternatively, the flange portion 168 is disposed on the end portion 160*a* of the patch 160 and extends along the vehicle up-down direction from the end of the end portion 160*a* (for example, forming into a T-shape to ensure a joint portion), thereby joining the vehicle outer side surface 122*d* of the pillar outer member 122 and overlapping with the fragile portion 126 (such as the flange portion 168 disposed on the patch 160 on the right side in FIG. 4). Preferably, the flange portion 168 is also disposed at a position further down than the upper end 126*a* of the fragile portion 126. In this way, when a side collision occurs to the vehicle, and an offset collision offset from the pillar 120 occurs, the flange portion 168 of the patch 160 can transmit the collision load to a wider range of the fragile portion 126, thereby improving the structural rigidity without affecting the bending deformation of the fragile portion 126 of the outer pillar member 122. However, the disclosure does not limit the specific structure and disposition of the patch 160, which can be adjusted according to requirements.

To sum up, in the vehicle side structure of the disclosure, the inner component is joined to the upper surface of the side sill and the vehicle inner side surface of the pillar outer member, and the bracket is disposed on the upper portion of the vehicle inner side surface of the side sill and connected to the inner component. The lower portion of the pillar outer member is formed with a fragile portion, and the upper end of the inner component is connected below the upper end of the fragile portion. Preferably, the inner component forms a closed cross-section on the vehicle inner side surface of the pillar outer member, the bracket has a cover-like cross-section, and the bracket and the inner component are formed with protruding ribs, thereby forming a highly rigid component. In this way, when a side collision occurs to the vehicle using the vehicle side structure, since the inner component do not extend to the upper end of the fragile portion, the pillar can be bent using the upper end of the fragile portion as a starting point to absorb the collision load. That is, the inner component disposed to improve the rigidity of the vehicle body does not affect the effect of the fragile portion in absorbing the collision load through bending deformation. In addition, the inner component and the bracket can support the pillar outer member from the vehicle inner side, and can transmit the collision load in the vehicle up-down direction, so that the collision load can be borne by the highly rigid side sill, inner component, bracket, etc, and converted into bending deformation in the vehicle up-down direction, thereby suppressing the deformation of the pillar toward the vehicle inner side. Accordingly, the vehicle side structure of the disclosure can more effectively absorb the collision load when a side collision occurs to the vehicle, thereby improving the rigidity of the vehicle body and suppressing the intrusion of the pillars toward the vehicle inner side.

Finally, it should be noted that the above embodiments are merely used to illustrate the technical solution of the disclosure, but not to limit the disclosure. Although the disclosure has been described in detail with reference to the embodiments, it should be understood that persons of ordinary skill in the art can still modify the technical solutions recorded in the embodiments or make equivalent substitutions for some or all of the technical features. However, the modifications or substitutions do not cause the essence of the corresponding technical solution to depart from the scope of the technical solution of the embodiments of the disclosure.

What is claimed is:

1. A vehicle side structure, comprising:
   a side sill, disposed on two sides of a floor panel in a vehicle width direction, and extending along a vehicle front-rear direction;
   a pillar, extending upward from the side sill along a vehicle up-down direction, and comprising a pillar outer member disposed on an outer side in the vehicle width direction;
   an inner component, joined between an upper surface of the side sill and a vehicle inner side surface of the pillar outer member; and
   a bracket, disposed on an upper portion of a vehicle inner side surface of the side sill, and connected to the inner component, wherein
   a lower portion of the pillar outer member is formed with a fragile portion, and
   an upper end of the inner component is located below an upper end of the fragile portion.

2. The vehicle side structure according to claim 1, wherein the pillar outer member has a panel thickness changing portion whose panel thickness becomes thinner toward the fragile portion, and
   the fragile portion is formed at the lower portion of the pillar outer member through the panel thickness changing portion.

3. The vehicle side structure according to claim 2, wherein the upper end of the fragile portion is formed further up than the inner component and has a gap that does not contact the inner component, and
   a width of the gap in the vehicle up-down direction is shorter than a width of the panel thickness changing portion in the vehicle up-down direction.

4. The vehicle side structure according to claim 1, wherein the inner component has an opposite surface opposite to the pillar outer member and a side surface extending toward the pillar outer member from the opposite surface, and forms a closed cross-section on an inner side of the pillar outer member in the vehicle width direction.

5. The vehicle side structure according to claim 2, wherein the inner component has an opposite surface opposite to the pillar outer member and a side surface extending toward the pillar outer member from the opposite surface, and forms a closed cross-section on an inner side of the pillar outer member in the vehicle width direction.

6. The vehicle side structure according to claim 3, wherein the inner component has an opposite surface opposite to the pillar outer member and a side surface extending toward the pillar outer member from the opposite surface, and forms a closed cross-section on an inner side of the pillar outer member in the vehicle width direction.

7. The vehicle side structure according to claim 4, wherein the bracket has a front side wall and a rear side wall connected to the inner component and an inner side wall connected to the front side wall and the rear side wall, and has a cover-like cross-section.

8. The vehicle side structure according to claim 7, wherein the inner component has a first inner component disposed on a vehicle front side and a second inner component disposed on a vehicle rear side,
   the front side wall is connected to the first inner component, and the rear side wall is connected to the second inner component.

9. The vehicle side structure according to claim 7, wherein the front side wall and the rear side wall of the bracket are formed with a first protruding rib extending in the vehicle width direction, and a cross-section area of the first protruding rib becomes smaller toward an inner side in the vehicle width direction.

10. The vehicle side structure according to claim 9, wherein the side surface of the inner component is formed with a second protruding rib extending in the vehicle width direction, and the first protruding rib on the rear side wall of the bracket is overlapped with the second protruding rib on the side surface of the inner component in the vehicle width direction.

11. The vehicle side structure according to claim 1, further comprising:
   a door beam, disposed around the side sill and the pillar, and having a closed cross-section protruding toward the outer side in the vehicle width direction, wherein
   an end portion of the door beam is overlapped with the fragile portion in the vehicle front-rear direction.

12. The vehicle side structure according to claim 11, further comprising:
   a patch, disposed on an outer side of the door beam in the vehicle width direction, and having an outer side surface and an upper side surface and a lower side surface extending from the outer side surface toward an inner side in the vehicle width direction, wherein the patch is joined to the door beam through the upper side surface and the lower side surface, and forms a closed cross-section on the outer side of the door beam in the vehicle width direction, and the closed cross-section formed by the patch extends from the door beam to an outer side of the pillar, and overlaps the pillar when viewed from a side.

13. The vehicle side structure according to claim 12, wherein an end portion of the patch is disposed at a position further down than the upper end of the fragile portion.

\* \* \* \* \*